TE US007614073B2

(12) United States Patent
Hugenberg et al.

(10) Patent No.: US 7,614,073 B2
(45) Date of Patent: Nov. 3, 2009

(54) DIGITAL HEADEND AND FULL SERVICE NETWORK FOR DISTRIBUTION VIDEO AND AUDIO PROGRAMMING

(75) Inventors: Keith F. Hugenberg, Westminister, CO (US); Martin William Rau, Omaha, NE (US); Atis Ojars Jurka, Monument, CO (US)

(73) Assignee: Qwest Communications International Inc., Denver, CO (US)

(*) Notice: Subject to any disclaimer, the term of this patent is extended or adjusted under 35 U.S.C. 154(b) by 1171 days.

(21) Appl. No.: 10/378,339

(22) Filed: Mar. 3, 2003

(65) Prior Publication Data

US 2003/0140353 A1 Jul. 24, 2003

Related U.S. Application Data

(63) Continuation of application No. 09/435,963, filed on Nov. 8, 1999, now abandoned.

(51) Int. Cl.
*H04N 7/173* (2006.01)
*H04N 7/16* (2006.01)

(52) U.S. Cl. .................. 725/114; 725/116; 725/129; 725/144; 725/146

(58) Field of Classification Search ................ None
See application file for complete search history.

(56) References Cited

U.S. PATENT DOCUMENTS

| 5,073,930 | A | | 12/1991 | Green et al. |
|---|---|---|---|---|
| 5,579,308 | A | * | 11/1996 | Humpleman ................ 370/352 |
| 5,583,863 | A | | 12/1996 | Darr, Jr. et al. |
| 5,600,573 | A | | 2/1997 | Hendricks et al. |
| 5,625,864 | A | * | 4/1997 | Budow et al. ................. 725/82 |
| 5,668,857 | A | * | 9/1997 | McHale .................... 379/93.07 |
| 5,677,905 | A | * | 10/1997 | Bigham et al. ......... 370/395.21 |
| 5,729,370 | A | | 3/1998 | Bernstein et al. |
| 5,734,652 | A | * | 3/1998 | Kwok ....................... 370/395.2 |
| 5,812,786 | A | | 9/1998 | Seazholtz et al. |
| 5,819,036 | A | * | 10/1998 | Adams et al. ................. 725/95 |
| 5,870,134 | A | * | 2/1999 | Laubach et al. ............. 725/114 |
| 5,877,755 | A | * | 3/1999 | Hellhake ..................... 725/114 |
| 5,923,642 | A | | 7/1999 | Young |
| 6,021,135 | A | | 2/2000 | Ishihara et al. |
| 6,229,788 | B1 | | 5/2001 | Graves et al. |
| 6,233,261 | B1 | | 5/2001 | Mesh et al. |
| 6,408,436 | B1 | | 6/2002 | de Haas |
| 6,459,427 | B1 | * | 10/2002 | Mao et al. .................... 725/112 |

\* cited by examiner

*Primary Examiner*—Scott Beliveau
*Assistant Examiner*—Jeremy Dufffield

(57) ABSTRACT

A digital headend architecture and full service network are provided to selectively demodulate and decode a variety of digital and analog feeds into baseband signals or pass digital programming through the headend. In accordance with one embodiment, the head end is provided with digital-turn-around capability to allow precompressed signals to passed through the head end with out any decompress or decoding into baseband signals. The head end includes at least one receiver for receiving signals sent by satellite, at least one antenna for receiving over-the-air signals as baseband composite video and audio signals, and a decoder connected to the at least one receiver for converting received satellite signals into baseband video and audio signals. At least one MPEG encoder is provided for encoding the baseband video and audio composite signals into multiplexed Single Program Transport Streams (SPTS). A remultiplexer is arranged to ATM encapsulate the SPTS, while an ATM switch outputs the ATM encapsulated SPTS for distribution over a fiber optic network.

15 Claims, 3 Drawing Sheets

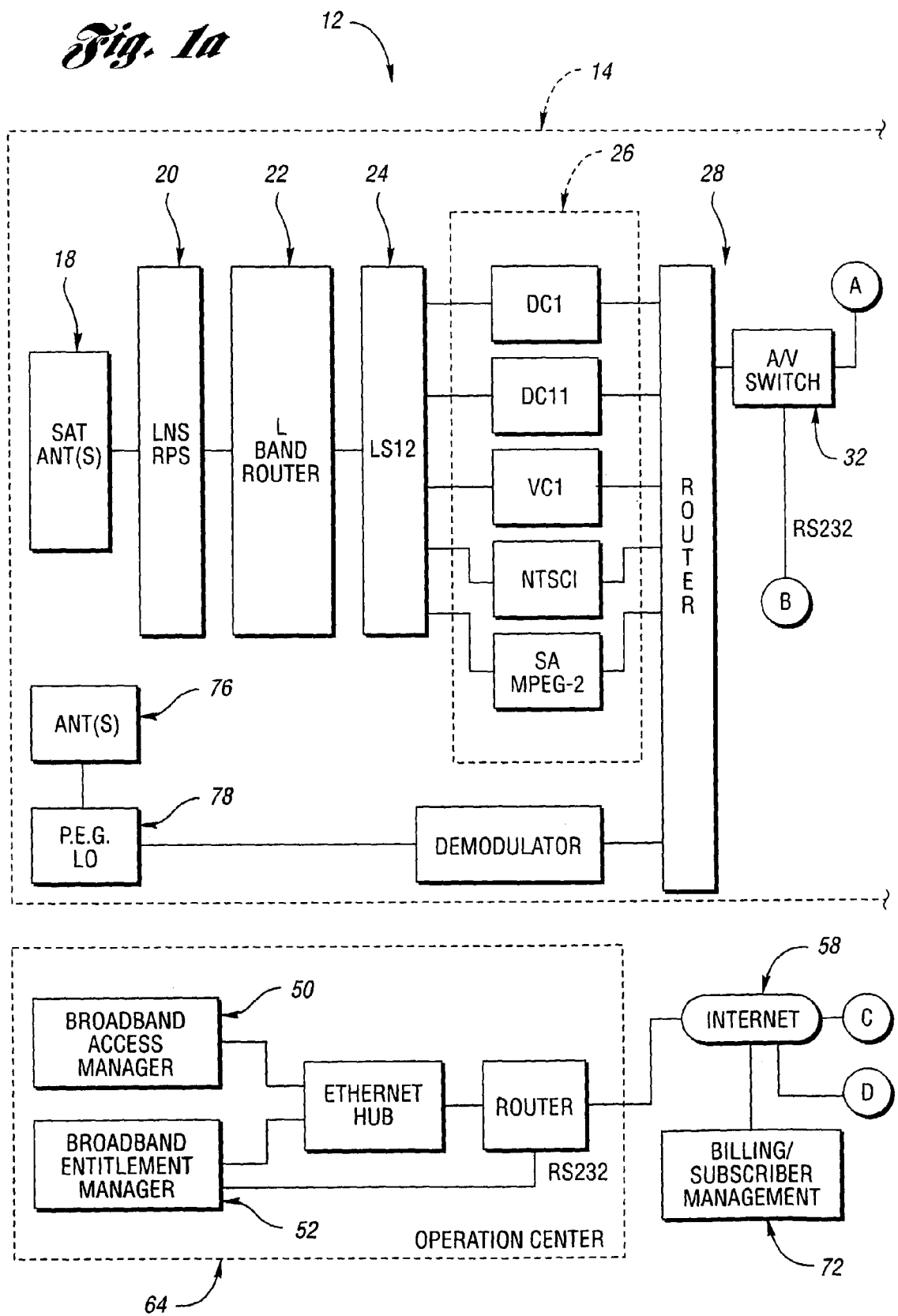

DIGITAL HEADEND AND FULL SERVICE NETWORK FOR DISTRIBUTION VIDEO AND AUDIO PROGRAMMING

CROSS-REFERENCE TO RELATED APPLICATIONS

This application is a continuation of U.S. application Ser. No. 09/435,963 filed Nov. 8, 1999 now abandoned which is incorporated herein in its entirety.

TECHNICAL FIELD

The present invention generally relates to full service networks used to distribute national and local video/audio programming, and more particularly to an improved headend architecture for receiving and distributing programs from a number of content providers over a variety of transmission media.

BACKGROUND ART

Generally, conventional cable television (CATV) systems operate to provide a full service distribution network for distributing combined national and local video and audio programming to customer locations. Such CATV systems collect signals from a variety of national and local service providers and television stations for rebroadcast over a dedicated coaxial cable distribution network. Conventional CATV systems typically include a headend office for receiving and rebroadcasting of the various service provider signals.

While such full service networks have operated to distribute signals to the customer locations, to date, such networks have struggled to provide the latest in customer services and features. These services and features often require speed, signal quality, and network flexibility that is simply not capable with existing full service networks.

In addition, available video headend architectures have been designed to include digital compression technology. In such an arrangement, nationally distributed programming is received locally through the use of satellite integrated receiver decoder/demodulators (IRDs) which demodulate, descramble, and in some cases decompress the programming to produce an NTSC analog, composite, or digital output. This output is in turn fed through distribution amplifiers and switcher/routers (used to provide redundancy and monitoring) and forwarded to respective encoders such as a DiviCom encoder for MPEG-2 compression. The various encoded streams are multiplexed together into a Multi-Program Transport Stream (MPTS) by a remultiplexer, and then forwarded onward for distribution to the cable customers. A system controller is used to construct the transport stream definition so that the remultiplexer is aware of which information from the various inputs, such as encoders, NVOD (Near Video-On-Demand) servers, etc., needs to be extracted and combined into the MPTS. The controller also monitors and controls (such as when combined with automated redundancy) the various equipment in the headend.

However, as a result of lower prices and higher video quality, the use of digital (MPEG-2) compression in the distribution of programming is gaining market acceptance. For example, program providers such as HBO and Viewers Choice now provide an entire satellite transponder worth of compressed content. Since typical head architectures automatically decompress the source signals before passing the programming on to the customer, these architectures prevent the full realization of the benefits provided by digital compression.

Therefore a need exists for both a full service network architecture which can meet the growing and changing demands of the market, and an improved headend architecture capable of higher efficiency and quality of signal distribution, while being able to support IRDs that deliver previously compressed MPTS.

DISCLOSURE OF INVENTION

It is therefore an object of the present invention to provide a full service network having an architecture flexible enough to accommodate changing program service provider technology.

It is another object of the present invention to provide a video headend architecture for use in a full service network having improved efficiency and higher quality signal distribution.

It is a further object of the present invention to provide a video headend architecture for use in a full service network having the ability to selectively demodulate and decode a variety of digital and analog feeds into baseband signals or pass digital programming through the headend.

It is also an object of the present invention to provide a video headend architecture for use in a full service network having the ability to selectively insert additional content, such as commercials, infomercials, and NVOD, into an MPTS.

It is yet another object of the present invention to provide a video headend architecture for use in a full service network having the ability to support IRDs that deliver previously compressed MPTS.

It is still another object of the of the present invention to provide a full service network having an architecture capable of performing MPEG-2 encoding, multiplexing into DS-3 or OC-3 asynchronous transfer mode (ATM) streams, and OC-12c encapsulation for SONET transport.

It is a further object of the present invention to provide a video headend architecture for use in a full service network having the ability to receive ATM streams and merge them into other ATM streams, i.e., PEG.

In accordance with these and other objects, the present invention provides a digital head end for use with a full service distribution network to distribute combined national and local video and audio programming to customer locations, wherein the head end includes at least one receiver for receiving signals sent by satellite, at least one antenna for receiving over-the-air broadcast channels, and a decoder connected to at least one receiver for converting received satellite signals into baseband video and audio signals. At least one MPEG encoder is provided for encoding the baseband video and audio composite signals into multiplexed Single Program Transport Streams (SPTS). A remultiplexer is arranged to ATM encapsulate the SPTS, and an ATM switch outputs the ATM encapsulated SPTS for distribution.

In accordance with one aspect of the present invention, the head end further includes at least one receiver arranged to receive and output digitally compressed signals from a satellite, wherein at least one digital compression receiver is directly connected to the remultiplexer to pass the precompressed signals through the head end without performing any decompressing of the signals. Thus, by allowing the video headend to support IRDs that deliver previously compressed MPTS, the present invention advantageously provides cost savings by using a single integrated receiver transcoder (IRT)

instead of a half dozen or more IRDs, and also eliminates local encoding requirements for that content.

In accordance with still another aspect of the present invention, a full service distribution network is provided for distributing combined national and local video and audio programming to customer locations. The network includes a head end having: at least one receiver for receiving signals sent by satellite; at least one antenna for receiving over-the-air signals as baseband composite video and audio signals; a decoder connected to the at least one receiver for converting received satellite signals into baseband video and audio signals; at least one MPEG encoder for encoding the baseband video and audio composite signals into multiplexed Single Program Transport Streams (SPTS); a remultiplexer arranged to ATM encapsulate the SPTS; and an ATM switch for outputting the ATM encapsulated SPTS. The network further includes a central office connected to the head end via a fiber optic network for receiving ATM encapsulated SPTS output by the ATM switch. The central office includes a broadband access system for selectively distributing received ATM encapsulated SPTS to at least one optical network unit or digital subscriber line asynchronous multiplexer (DSLAM) connected to a customer location.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1B:
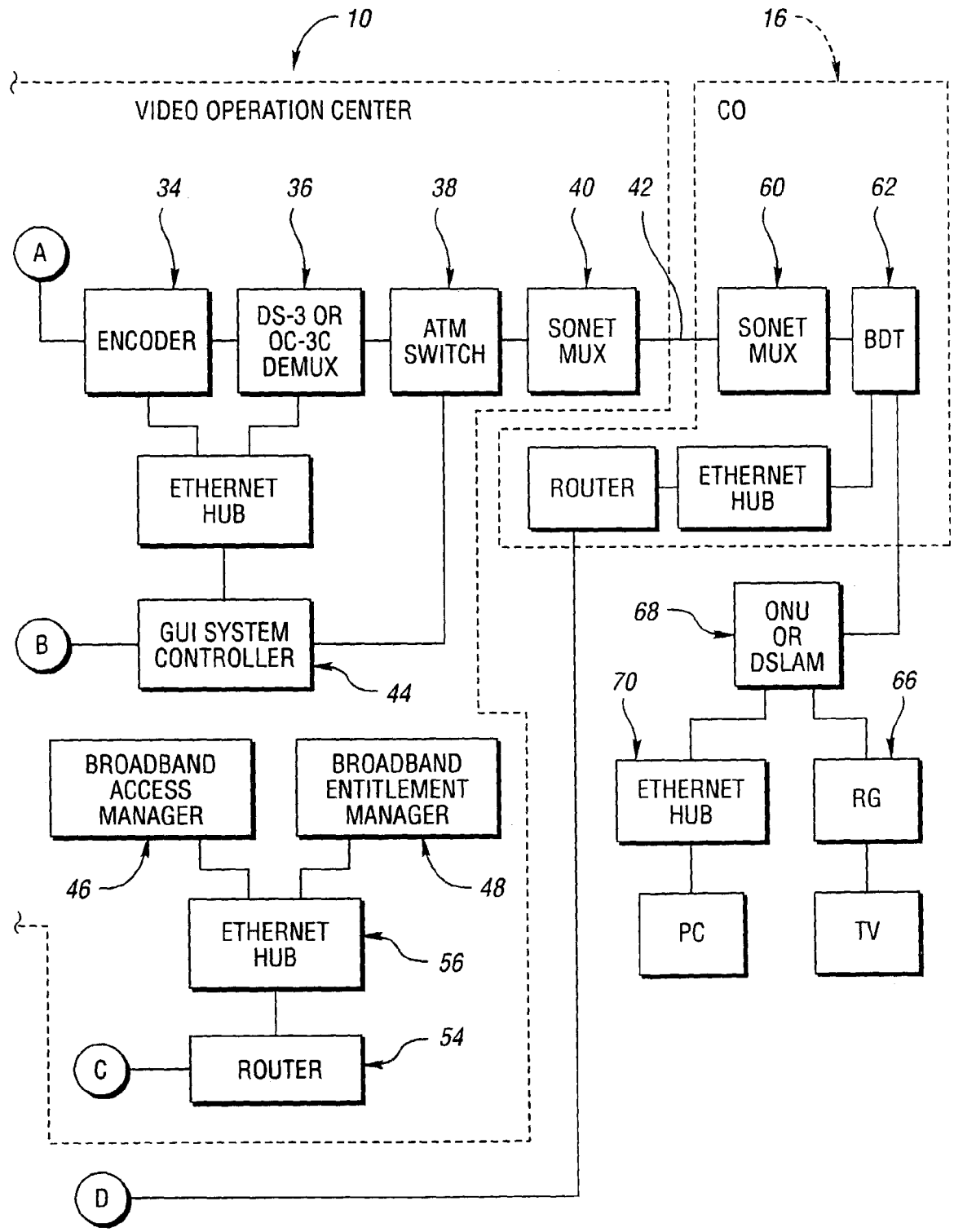
FIG. 1 is a block diagram of a full service distribution system in accordance with the present invention.

Referring now to FIG. 1, a block diagram is provided showing the primary network systems used to form a distribution system 10 in accordance with the present invention. System 10 is arranged to obtain, maintain and deliver nationally-distributed broadcast programming, including digital video and audio services (basic and premium) to the end user. Additional systems used for managing the primary systems, e.g., for managing an ATM switch, are not shown for clarity of description. One of the primary systems includes a video operations center 12 formed by the components located at a video headend 14. As described in more detail below, these components receive, demodulate, and decrypt video and audio content from one or more National Broadcast Programming Source Systems via appropriate broadcast satellite networks, and provide digital conversion to an ATM adaption layer (AAL)5 encapsulated MPEG 2 Single Program Transport Streams (SPTS) for delivery to a central office 16.

Video operations center 12 receives content from a number of satellite sources. Each satellite contains a number of transponders, half of which transmit with vertical polarization, the other with horizontal polarization. Within the video center, a separate dish 18 may be set up to receive both a vertically and/or horizontally polarized transmissions from a given satellite.

From each satellite dish, an LNB coax is connected to a remote power supply 20 used to power an LNB, which then connects to an L-band router 22. The L-band router provides redundancy and isolates the network from configuration changes needed at the satellite dishes due to failures, changes to the channel line-up, or changes in content transmission, e.g., moving a broadcast program from one satellite to another.

From the L-band router, the content from each LNB coax is sent to 1 to 12 satellite receivers 26 via an LS 12 splitter 24. Satellite receiver(s) 26 are selected based on the encoding scheme used by the uplink facility to broadcast the content. Each receiver is arranged to support programming from a given National Broadcast Programming Source System using one of several encoding/compression techniques at the uplink facilities. In a preferred embodiment, the headend is arranged to support General Instrument's (GI) DigiCipher II encoded content, which consists of an MPEG 2 multi-program transport stream (MPTS) containing MPEG 2 encoded video and Dolby AC-3 audio. The content is encrypted at an uplink facility using GI's VideoCipher II encryption scheme. Support is also provided for GI's DigiCipher encoded content (also referred to as DigiCipher I to avoid confusion), VideoCipher II content, and clear NTSC. DigiCipher I is a GI-specific digital encoding scheme that uses GI's DigiCipher I encryption, while VideoCipher II is a baseband NTSC content encrypted at an uplink facility using GI's VideoCipher II encryption scheme content. Clear NTSC is baseband NTSC content that is not encrypted at an uplink facility. Also, support is provided for content encoding using Scientific Atlanta's (SA) PowerVu digital compression system which is received as an MPEG 2-compliant MPTS. Encryption is based on SA's proprietary encryption scheme.

For video and audio programming source systems that use GI's DigiCipher II, the content can be recovered using a GI DSR 4500 commercial Integrated Receiver Decoder/Demodulator (IRD). The output of the DSR 4500 is baseband video and stereo L/R audio. Alternatively, this configuration can use a modified version of a GI IRT-1000 which will recover the content without having to perform any decoding, as described below in connection with the digital-turn-around aspect of the present invention. The output of an IRT-1000 or IRT-2000 is an MPEG 2 multiple program transport stream that is routed directly to a remultiplexer.

For video and audio programming source systems that use GI's DigiCipher I system, the content can be recovered using a GI DSR 1500 Receiver. The output of this is baseband video and stereo L/R audio. For analog video and audio programming source systems which use GI's VideoCipher II Plus encryption system, the content can be recovered using a GI C6R VCII receiver. The output of this is baseband composite video and stereo L/R audio. For analog video and audio programming source systems which broadcast clear NTSC signals, the content can be recovered using a GI C6R receiver. The output of this is also baseband composite video and stereo L/R audio. Finally, for video and audio programming source systems which uses SA's Power Vu digital compression system, the content can be recovered using a SA MPEG 2 commercial IRD. The output of the SA IRD is baseband video and stereo L/R audio. Other receiver types can be used as appropriate.

Thus, the output from each receiver is a baseband video and audio signal which is sent to a video and audio router 28 for routing to a audio/video switch 32 and a bank of MPEG encoders 34. At each MPEG encoder, the video and audio content is encoded using MPEG 2 for video, and AC-3 for audio, and multiplexed into a SPTS. Each SPTS is then sent to a remultiplexer 36 where it is AAL5/ATM encapsulated and routed to an ATM edge switch 38 and SONET multiplexer 40 for distribution to central office 16 over an fiber optic cable 42, such as an OC-48 line.

A system controller arrangement 44, or network management system (NMS), is preferably used to configure the digital equipment and the ATM circuits, as well as providing MPEG encoder and remultiplexer redundancy. While only a single NMS is shown, the ATM switch is configured by its own NMS. The system controller provides a GUI-based network management system for monitoring and controlling various elements (encoder, modulators, switches, etc) of a digital video network. In addition, with the audio/video switch, selected content can be split off and routed to a monitoring system. Also within the video operations center, work stations 46 and 48 are programmed to operate as broadband access element manager and broadband entitlement manager that together function as broadband service managers. These two systems provide access from the video operations center, e.g., for second and third tier repair information. A router 54 and Ethernet hub 56 provide a suitable connection to the video center via an Internet or Intranet connection 58.

Programs that are broadcast from the video center are delivered over SONET multiplexers 60 to an Access System located in a central office. Within the Access System, a broadband digital terminal (BDT) 62 maintains service and subscriber entitlement information received from the Broadband entitlement manager located in the integrated operations center 64. The BDT also maintains a two-way signaling channel with each residential gateway (RG) 66 connected at each customer location within a designated service area. This allows a RG to sign onto the network and to exchange channel change messages. When an RG sends a channel change request to connect to a particular program stream, the BDT checks the entitlement information, and if entitled, delivers the appropriate MPEG 2 SPTS over AAL5/ATM to a corresponding broadband premises network. An optical network unit (ONU) 68 or DSLAM acts as a local service hub for connection of a cluster of customer residences.

The BDT supports an SNMP interface with the broadband access element manager for configuring the network and drop, and with the Broadband entitlement manager for service level functions such as service activation and updating entitlements. The BDT also supports a DSM-CC signaling channel to each RG. When the BDT receives a channel change request from an RG, it determines from the entitlement information if the RG is entitled to receive the requested the broadcast program. If the RG is entitled, the BDT returns a channel change confirm message indicating the VPI/VCI to tune to and deliver the program to the RG. The program is delivered as an MPEG 2 SPTS/AAL5/ATM/OC-3c signal to the ONU, modulated (such as using 16 QAM) by the ONU, and delivered as an MPEG 2 SPTS over AAL5/ATM/QAM16/coax or twisted pair to the broadband premises network.

Each broadcast program terminates on each BDT within a given service domain on the same virtual path ID (VPI)/virtual channel ID (VCI). This VPI/VCI can have the same value as the VPI/VCI provisioned on the outbound side of the ATM edge switch to facilitate troubleshooting. In addition, the network can be configured such that this VPI/VCI value is also assigned at the remultiplexer.

The BDT supports an optical fiber connection, such as a 155 mbit/sec-622 mbit/sec connection, to a set of curbside ONUs. In a preferred embodiment, the Access System is arranged to support up to 64 ONUs per BDT. Each ONU can provide a coaxial and/or twisted-copper wire pair (TWP) drop to each home, while each DSLAM provides a twisted pair drop. In a preferred embodiment, the Access System supports several sizes of ONUs/DSLAMs, e.g., 8, 16, 32, etc. Each ONU/DSLAM is sized to support 1.5 2-wire/UVG telephony services per living unit. A 10 base T Ethernet hub 70 allows connection of a PC to the network.

The broadband network located on the side of the customer building or residence typically includes a network interface device (NID) (not shown). The NID includes a filter for splitting telephony services from the broadband services, i.e., video and dat services. The telephony services will use existing telephony wiring while the broadband services are sent to the input of the RG. The RG can be arranged to support three video outputs and a high speed data output. However, this is not to be construed as limiting. The RG recovers the MPEG content from the ATM transport, decodes it, and delivers it to the consumers television/VCR.

An integrated operations center 64 includes the broadband access element manager and broadband entitlement manager server systems 50 and 52 for configuring and managing the Access System, the video and audio services carried over the Access System, and RG access to those services. These functions enable network control over the delivery of video and audio services. These systems communicate with the Access System through a private corporate data network.

An external Billing/Subscriber Management System 72 is also provided to manage nationally-distributed services as well as RG access to these services. Information from the Subscriber Management System is delivered to the Broadband entitlement manager to allow the entitlement manager to manage the information for distribution over system 10. In a preferred embodiment, the Subscriber Management System can connect at a physical layer through an IP network using a 56 kbps modem connection to a router (not shown). The router provides a serial interface to a protocol converter (DD4030) which then interfaces via an asynchronous interface to a second router (not shown) for accessing a corporate IP network. At video operations center 12, the IP network terminates on router 54 which supports an asynchronous interface to the Broadband entitlement manager. Over this connection, Broadband and Subscriber Management System 72 utilize an ACC4000D wirelink protocol for conveying service related information back and forth.

As shown, the present invention obtains, manages, and delivers locally-sourced video and audio programming to the end user. As noted above, additional systems used for managing the primary systems, e.g., for managing an ATM switch, are not shown to promote clarity. The video operations center includes antennas 76 for receiving and recovering off-air channels (VHF and UHF), locally-sourced programming providing public, government, and educational content, and program guide information. For off-air channels, the content is received from an antenna system and processed by a bank of demodulators, such a General Instrument C6BD that demodulates the signals as NTSC video and stereo L/R audio. Thus, the output from each demodulator is baseband, composite video, and stereo audio. PEG LO programming services 78 include both pre-recorded content over which administrators at network 10 have editorial control, and franchise-specific content over which the network administrators do not have editorial control. This content is received as baseband, composite video and stereo or mono audio.

For national and off-air programming, the baseband video and audio output is sent to video and audio router 28. The baseband video and audio signals are subsequently routed to the bank of MPEG encoders 34. At each MPEG encoder, the video and audio content is encoded using MPEG 2 for video and stereo for the audio, and multiplexed into a MPTS. Each MPTS is then sent to remultiplexer 36, and is AAL5/ATM encapsulated and then routed to the ATM edge switch for distribution over the broadband access network. PEG (public, educational, and government) channels are encoded respectively at a programming site, and distributed to the head end via a high speed network directly into the ATM switch. The PEG channels are then multiplexed with the remaining channels.

System controller 44 is arranged to configure the encoder input and output and set the audio and video data rate. This data rate will determine the downstream bandwidth for the content stream. The system controller is also used to configure the VPI/VCI on the outgoing connection from the remultiplexer to the ATM Edge Switch. The system controller can also be used to configure the VPI/VCI on the incoming connection on the ATM Edge Switch. The system controller communicates with the encoder and remultiplexer via an Ethernet network, and communicates with the audio/video switch via an RS-232 connection.

Within the broadband premises network, the RG demodulates the MPEG 2 SPTS/AAL5/ATM streams and sends them to the coax distribution plant at the customer location. The outputs from the RG include: a composite video output, an S-Video output, stereo L/R outputs, and composite video and summed L/R modulated onto channel 3/4.

In operation, once the network infrastructure is in place and the Subscriber Management System/broadband entitlement manager communication path is established, the network operator can access the broadband entitlement manager through a graphical user interface (GUI) in order to establish a record for a broadband business system interface to the Subscriber Management System. The information that is maintained by the broadband entitlement manager includes business system name and an assigned Business System Interface (BSI) code, contact name, phone number, and mailing address, and business system privileges.

Before nationally-distributed and locally sources programming can be delivered to the end user, the video operation center and Access System must be configured to support the incoming video/audio streams. To configure the video center, the following steps are performed. First, the equipment in the video operation center is configured for receiving, demodulating, and decoding the content of nationally-distributed programming by configuring a satellite dish and LNB to retrieve the content from the appropriate satellite. Then, a connection path is created between the following: the LNB coax output to the power supply, from the power supply to the L-band router, from the L-band router to the LS12 splitter, and from the splitter to an appropriate receiver depending on the encoding/encryption scheme used at the uplink facility. Finally, the receiver is configured to tune to the desired channel from the content stream, and create a connection path from the receiver to the audio and video router and from the audio and video router.

For locally-sourced programming, the antenna system is configured to receive the off-air channel. A connection path is created from the antenna to the demodulator, from the demodulator to the audio and video router, and from the router to the encoder. For PEG content, as noted above, the signals are encoded respectively at a programming site, and distributed to the head end via a high speed network directly into the ATM switch. The PEG channels are then multiplexed with the remaining channels.

Based on the type of programming, e.g., sports versus news station, the appropriate data rate/bandwidth is configured in the MPEG encoder. At the ATM switch, a PVC connection is established between the incoming DS-3 or OC-3c (from the remultiplexer) to the outgoing OC-12c ports that will deliver the stream to each BDT within the selected service domain. For each outgoing port, VPI/VCIs are provisioned such that all outgoing facilities (ports) connecting to BDTs within the same service domain use the same VPI/VCI for the content stream. The network can be managed such that the same VPI/VCI is used from the remultiplexer to the ATM switch, and from the ATM switch into the SONET facilities on to the BDTs located at the CO.

For each broadcast program, video service attributes are defined and stored within the Broadband entitlement manager. In particular, the Broadband entitlement manager maintains a video service record for each business system managing the content in the network. Each video service record maintains a business system name and BSI code, and a list of broadcast programs managed by the given business system.

Once the broadcast programs are defined, they are assigned to one or more service domains. For each service domain, a channel lineup record is created. A channel lineup record identifies the service domain name and headend number, and a list of broadcast programs. These attributes are used to establish the Broadcast Program Video MIB object in the BDT.

Figure 2:
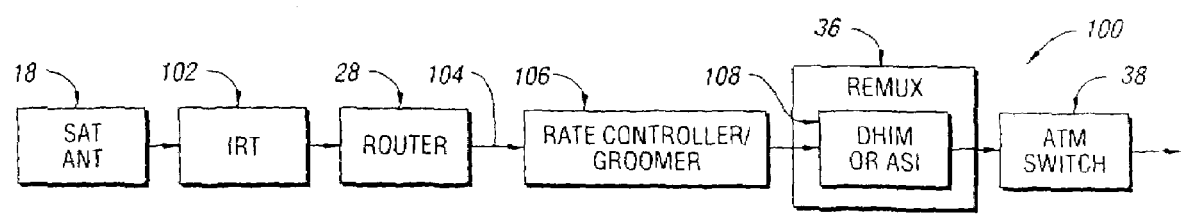
FIG. 2 is a block diagram of a video headend pass through digital compression arrangement in accordance with the present invention.

In accordance with another aspect of the present invention, the headend is arranged to provide digital turnaround (DTA) so that the headend can receive, incorporate, and remultiplex digital transport streams of pre-compressed programming from various service providers without first decoding the content into base level signal. In other words, DTA refers to the cable headend having the capability to receive previously compressed video, audio, and data and to combine it with locally compressed content for distribution through a digital cable system. FIG. 2 provides a block circuit diagram showing a DTA system 100 in accordance with the present invention.

More specifically, as described above, an IRD demodulates and outputs a single non-scrambled/non-compressed analog composite program. On the other hand, system 100 uses an Integrated Receiver Transcoder (IRT) 102 to demodulate and output a digital stream of previously compressed programming, such as an entire transponder worth of pre-compressed video programming such as received from satellite antenna 18. The IRT outputs via router 28 an SPTS 104 which defines an amalgamation of independent MPEG-2 compressed element streams. The exact content of this transport stream is defined in program and service information (PSI) tables contained within the SPTS. The SPTS is output by router 28 to a rate controller/groomer 106 arranged to process the signal into a desired output transmission rate.

Thus, in accordance with the present invention, the DTA arrangement allows the headend to support IRDs that deliver previously compressed SPTS. This in turn provides significant cost savings to the headend by using one IRT 102 instead of a half dozen or more IRDs. Additional savings are provided by eliminating local encoding requirements for compressed content. The present invention provides this capability by enhancing remultiplexer 36 with one or more input modules that are capable of receiving SPTS. These modules are arranged to filter, remap, and combine MPEG-2 transport streams. A Digital Headend Interface Module (DHIM) 106 accepts SPTS in a format compatible with General Instrument's Digital Headend Expansion Interface (DHEI), and can be used in conjunction with General Instrument's IRT-2000 family of satellite receivers. Alternatively, an asynchronous system interface (ASI) can be used in place of the DHIM. Signals are then output through ATM switch 38.

The input of the DHIM or ASI is configured using system controller 44 as follows. First, an input source icon is added and described by name and type, and place it onto a transport submap. Then, each circuit within the input source is created and described including element name, bandwidth requirement, and circuit type, i.e., video/audio/data. The input source is then connected to the appropriate DHIM input port.

Thus, the present invention provides a head architecture that has the capability of inserting VOD (Video-On-Demand), NVOD, digital advertisement, and web browser content.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A full service distribution network for distributing combined national and local video and audio programming to customer locations comprising:
    a head end comprising:
        a plurality of receivers, at least one of the plurality of receivers receiving digital signals sent by satellite transmission;
        at least one antenna for receiving over-the-air analog signals as baseband composite video and audio signals;
        a digital router for receiving the digital signals;
        a digital splitter for receiving the digital signals from the digital router;
        a plurality of decoders coupled to the digital splitter for converting the digital signals into baseband video and audio signals, the digital splitter automatically routing each of the digital signals to the appropriate decoder based on the encoding scheme of the digital signals;
        an analog audio and video router for receiving audio and video from the plurality of decoders and the at least one antenna;
        an analog switch configured to receive an output from the analog router;
        a decoder connected to the at least one receiver for converting received satellite signals into baseband video and audio signals;
        at least one MPEG encoder coupled to the analog switch for encoding the baseband video and audio composite signals into multiplexed Single Program Transport Streams (SPTS);
        a remultiplexer arranged to ATM encapsulate the SPTS; and
        an ATM switch for outputting the ATM encapsulated SPTS; and
    a central office connected to the head end via a fiber optic network for receiving the ATM encapsulated SPTS output by the ATM switch, the central office including a broadband access system for selectively distributing received ATM encapsulated SPTS to at least one optical network unit or DSLAM connected to a customer location.

2. The full service distribution network of claim 1 wherein the head end further comprises at least one digital compression receiver arranged to receive and output digitally compressed signals from a satellite, the at least one digital compression receiver connected to provide an output signal to the remultiplexer without performing any decoding and decompressing of the signals to analog.

3. The full service distribution network of claim 2 further comprising a second router and a rate controller/groomer connected between the at least one digital compression receiver and the remultiplexer for processing the non-decoded and non-decompressed signal before output from the head end.

4. The full service distribution network of claim 1 wherein the head end further comprises a system controller arranged to configure the MPEG encoder input and output and set an audio and video data rate, as well as configure an outgoing and incoming connection from the remultiplexer to the ATM switch.

5. The full service distribution network of claim 4 wherein the system controller comprises a graphical user interface (GUI) based control program, the system controller communicating with the encoder and remultiplexer via an Ethernet network and communicating with an audio/video switch via an RS-232 connection.

6. The full service distribution network of claim 1 wherein the customer location comprises a residential gateway connected to the optical network unit or DSLAM.

7. The full service distribution network of claim 1 wherein the customer location comprises an Ethernet hub connected to the optical network unit or DSLAM.

8. The full service distribution network of claim 1 wherein the head end further comprises a SONET multiplexer connecting the ATM switch to the fiber optic cable.

9. The full service distribution network of claim 1 wherein the head end is arranged to insert into the SPTS at least one type of content selected from a set consisting of VOD (Video-On-Demand), NVOD (Near Video-On-Demand), digital advertisement, and web browser content.

10. A digital head end for use with a full service distribution network to distribute combined national and local video and audio programming to customer locations comprising:
    at least one receiver for receiving signals sent by satellite;
    at least one antenna for receiving over-the-air signals as baseband composite video and audio signals;
    a decoder connected to the at least one receiver for converting received satellite signals into baseband video and audio signals;
    at least one MPEG encoder for encoding the baseband video and audio composite signals into multiplexed Single Program Transport Streams (SPTS);
    a remultiplexer arranged to ATM encapsulate the SPTS;
    an ATM switch for outputting the ATM encapsulated SPTS; and
    a system controller coupled between an analog switch and the ATM switch, the system controller arranged to configure the MPEG encoder input and output and to set an audio and video data rate based on properties of the audio and video data, the system controller communicating with the analog switch via a serial communications channel.

11. The head end of claim 10 further comprising at least one receiver arranged to receive and output digitally compressed signals from a satellite, wherein the at least one digital compression receiver is connected to provide an output signal to the remultiplexer without performing any decoding and decompressing of the signals to analog.

12. The head end of claim 11 further comprising a router and a rate controller/groomer connected between the at least one digital compression receiver and the remultiplexer for processing the non-decoded and non-decompressed signal before output from the head end.

13. The head end of claim 10 wherein the system controller comprises a graphical user interface (GUI) based control program, and communicates with the encoder and remultiplexer via an Ethernet network.

14. The head end of claim 10 further comprising a SONET multiplexer connection the ATM switch to the fiber optic cable.

15. The head end of claim 10 wherein the head end is arranged to insert into the SPTS content having at least one content type including VOD (Video-On-Demand), NVOD (Near Video-On-Demand), digital advertisement, and web browser content.

* * * * *

UNITED STATES PATENT AND TRADEMARK OFFICE
CERTIFICATE OF CORRECTION

PATENT NO. : 7,614,073 B2
APPLICATION NO. : 10/378339
DATED : November 3, 2009
INVENTOR(S) : Keith F. Hugenberg, Martin William Rau and Atis Ojars Jurka It is certified that error appears in the above-identified patent and that said Letters Patent is hereby corrected as shown below:

Title Page, Item (54), replace "HEADEND" with "HEAD END", therefor.

Title Page, Item (75) Inventors, replace "Westminister" with "Westminster", therefor.

Title Page, Item (57) Abstract, Line 1, replace "headend" with "head end", therefor.

Title Page, Item (57) Abstract, Line 4, replace "headend" with "head end", therefor.

Column 1, Line 1, replace "headend" with "head end", therefor.

Column 1, Line 16, replace "headend" with "head end", therefor.

Column 1, Line 30, replace "headend" with "head end", therefor.

Column 1, Line 39, replace "headend" with "head end", therefor.

Column 1, Line 59, replace "headend" with "head end", therefor.

Column 1, Line 66, replace "headend" with "head end", therefor.

Column 2, Line 6, replace "headend" with "head end", therefor.

Column 2, Line 18, replace "headend" with "head end", therefor.

Column 2, Line 22, replace "headend" with "head end", therefor.

Column 2, Line 25, replace "headend" with "head end", therefor.

Column 2, Line 27, replace "headend" with "head end", therefor.

Column 2, Line 31, replace "headend" with "head end", therefor.

Column 2, Line 34, delete "object of the of the present" and insert --object of the present--, therefor.

Column 2, Line 40, replace "headend" with "head end", therefor.

Column 2, Line 64, replace "headend" with "head end", therefor.

Column 3, Line 34, replace "headend" with "head end", therefor.

Column 3, Line 51, replace "headend" with "head end", therefor.

Column 3, Line 63, replace "transmissions" with "transmission", therefor.

Column 4, Line 14, replace "headend" with "head end", therefor.

Column 5, Line 47, delete "the broadcast program." and insert --broadcast program.--, therefor.

Column 6, Line 10, replace "dat" with "data", therefor.

Column 6, Line 53, delete "such a General Instrument" and insert --such as General Instrument--, therefor.

Column 7, Line 37, replace "sources" with "sourced", therefor.

Column 8, Line 20, replace "headend" with "head end", therefor.

Column 8, Line 25, replace "headend" with "head end", therefor.

Column 8, Line 26, replace "headend" with "head end", therefor.

Column 8, Line 30, replace "headend" with "head end", therefor.

Column 8, Line 51, replace "headend" with "head end", therefor.

Column 8, Line 53, replace "headend" with "head end", therefor.

Column 8, Line 60, replace "Headend" with "Head end", therefor.

Column 8, Line 62, replace "Headend" with "Head end", therefor.

Column 9, Line 3, delete "and place it onto" and insert --and placed onto--, therefor.

Column 9, Line 8, delete "provides a head architecture" and insert --provides a head end architecture--, therefor.

Column 10, Line 1, Claim 2 delete "decoding and decom-" and insert --decoding or decom- --, therefor.

Signed and Sealed this

Sixteenth Day of March, 2010

David J. Kappos
*Director of the United States Patent and Trademark Office*